(12) United States Patent
Kato et al.

(10) Patent No.: US 11,957,135 B2
(45) Date of Patent: Apr. 16, 2024

(54) CHOCOLATE-LIKE FOOD CONTAINING POLYUNSATURATED FATTY ACID

(71) Applicant: Fuji Oil Holdings Inc., Osaka (JP)

(72) Inventors: Masaharu Kato, Ibaraki (JP); Miwako Morikawa, Ibaraki (JP); Masahiro Sugiyama, Ibaraki (JP)

(73) Assignee: Fuji Oil Holdings Inc., Osaka (JP)

( * ) Notice: Subject to any disclaimer, the term of this patent is extended or adjusted under 35 U.S.C. 154(b) by 1174 days.

(21) Appl. No.: 16/082,238

(22) PCT Filed: Feb. 28, 2017

(86) PCT No.: PCT/JP2017/007908
§ 371 (c)(1),
(2) Date: Sep. 4, 2018

(87) PCT Pub. No.: WO2017/150559
PCT Pub. Date: Sep. 8, 2017

(65) Prior Publication Data
US 2020/0288743 A1    Sep. 17, 2020

(30) Foreign Application Priority Data

Mar. 2, 2016  (WO) .................. PCT/JP2016/056457
Jun. 9, 2016  (JP) ................................ 2016-115392
Sep. 28, 2016 (JP) ................................ 2016-190075

(51) Int. Cl.
*A23G 1/36* (2006.01)
*A23D 7/00* (2006.01)
*A23G 1/40* (2006.01)
*A23G 1/44* (2006.01)
*A23G 1/48* (2006.01)

(52) U.S. Cl.
CPC .............. *A23G 1/36* (2013.01); *A23D 7/003* (2013.01); *A23G 1/40* (2013.01); *A23G 1/44* (2013.01); *A23G 1/48* (2013.01); *A23V 2002/00* (2013.01)

(58) Field of Classification Search
CPC .................................... A23G 1/36; A23G 1/44
See application file for complete search history.

(56) References Cited

U.S. PATENT DOCUMENTS

| | | | |
|---|---|---|---|
| 3,939,290 A | 2/1976 | Terada et al. | |
| 5,084,289 A | 1/1992 | Shin et al. | |
| 6,063,408 A * | 5/2000 | Yamazaki | A23G 1/042 |
| | | | 426/660 |
| 6,746,695 B1 * | 6/2004 | Martin | A61K 36/77 |
| | | | 424/734 |
| 2005/0175723 A1 | 8/2005 | Furuta et al. | |
| 2005/0181019 A1 | 8/2005 | Palmer et al. | |
| 2006/0134294 A1 * | 6/2006 | McKee | A23G 1/36 |
| | | | 426/548 |
| 2007/0085058 A1 | 4/2007 | Mora-Gutierrez et al. | |
| 2007/0269493 A1 * | 11/2007 | Lang | A23G 1/36 |
| | | | 424/440 |
| 2009/0131699 A1 | 5/2009 | Furuta et al. | |
| 2012/0251685 A1 | 10/2012 | Wang-Nolan et al. | |
| 2013/0183428 A1 * | 7/2013 | Declercq | A23G 1/36 |
| | | | 426/519 |
| 2014/0154358 A1 * | 6/2014 | Veen | A23L 33/10 |
| | | | 426/631 |
| 2015/0159117 A1 | 6/2015 | Kano et al. | |
| 2016/0256556 A1 | 9/2016 | Kasama et al. | |

FOREIGN PATENT DOCUMENTS

| | | |
|---|---|---|
| CA | 2930510 A1 | 5/2015 |
| CN | 1685033 A | 10/2005 |
| CN | 103652216 A | 3/2014 |
| CN | 103891922 A | 7/2014 |
| CN | 104470373 A | 3/2015 |
| EP | 1564278 A1 | 8/2005 |
| JP | S5917949 A | 1/1984 |
| JP | S62153385 A | 7/1987 |
| JP | S6312697 A | 1/1988 |
| JP | H0586395 A | 4/1993 |
| JP | H05084436 A | 4/1993 |
| JP | H05292885 A | 11/1993 |

(Continued)

OTHER PUBLICATIONS

Notice of Reasons for Refusal issued in Japanese Patent Application No. 2018-503,344 dated Jul. 1, 2021.
Office Action issued in corresponding Singaporean Patent Application No. 11201807310Q dated Jan. 30, 2020.
Office Action issued in corresponding Singaporean Patent Application No. 11201807311W dated Jan. 30, 2020.
Buck, "Antioxidants in Soya Oil." Journal of the American Oil Chemists' Society, 1981, vol. 58, No. 3, pp. 275-278.
Bandyopadhyay et al. "Antioxidant activity of natural plant sources in dairy dessert (Sandesh) under thermal treatment." LWT Swiss society of Food Science and Technology, 2008, vol. 41, No. 5, pp. 816-825.
Yazawa, "Production and Utilization of EPA and DHA." Journal of the Brewing Society of Japan, 1995, vol. 90, No. 4, pp. 267-272.
Marcuse "Antioxidative Effect of Amino-Acids" Nature vol. 186, pp. 886-887, 1960.
Office Action dated Jul. 21, 2021, issued in Chinese Patent Application No. 201780014630.6.
Office Action dated Aug. 2, 2021, issued in Chinese Patent Application No. 201780014720.5.

(Continued)

*Primary Examiner* — Jeffrey P Mornhinweg
(74) *Attorney, Agent, or Firm* — Morse, Barnes-Brown & Pendleton, P.C.; Russell L. Widom

(57) ABSTRACT

The present invention relates to a chocolate-like food product containing polyunsaturated-fatty-acid-containing oil and fat. An object of the present invention is to provide a chocolate-like food product with reduced flavor change that occurs with time. As a result of the finding that incorporation of amino acid into a chocolate-like food product containing polyunsaturated-fatty-acid-containing oil and fat significantly reduces the unpleasant odor that occurs with time, the present invention has been accomplished. The amino acid is preferably at least one amino acid selected from glycine, glutamic acid, alanine, proline, lysine, tryptophan, methionine, valine, serine, histidine, isoleucine, leucine, phenylalanine, arginine, threonine, cysteine, aspartic acid, glutamine, or asparagine.

7 Claims, No Drawings

(56) References Cited

FOREIGN PATENT DOCUMENTS

| | | | |
|---|---|---|---|
| JP | H0851928 | A | 2/1996 |
| JP | H09143465 | A | 6/1997 |
| JP | H09235584 | A | 9/1997 |
| JP | 2000229118 | A | 8/2000 |
| JP | 2002142673 | A | 5/2002 |
| JP | 2004331724 | A | 11/2004 |
| JP | 2005506847 | A | 3/2005 |
| JP | 2012244929 | A | 12/2012 |
| JP | 2013/006882 | A | 1/2013 |
| JP | 2013159730 | A | 8/2013 |
| JP | 2016186002 | A | 10/2016 |
| KR | 10/2005/0007718 | A | 1/2005 |
| WO | WO-00/39248 | A1 | 7/2000 |
| WO | WO-01/96506 | A1 | 12/2001 |
| WO | WO-03/037100 | A1 | 5/2003 |
| WO | WO-2009/013757 | A1 | 1/2009 |
| WO | WO-2013/172348 | A1 | 11/2013 |
| WO | WO-2014/013002 | A1 | 1/2014 |
| WO | WO-2015/053252 | A1 | 4/2015 |

OTHER PUBLICATIONS

Riisom et al. "Effect of Amino Acids on the Autoxidation of Safflower Oil in Emulsions"; Journal of the American Oil Chemists' Society, 1980, pp. 354-359, vol. 57, No. 10.

Mosca et al. "Biocompatible Water-in-Oil Emulsion as a Model to Study Ascorbic Acid Effect on Lipid Oxidation"; Journal of Physical Chemistry, Part B, 2008, pp. 4635-4641, vol. 112, No. 15.

USDA: "National Nutrient Database for Standard Reference Release Apr. 1, 2018, Basic Report 19904, Chocolate, dark, 70-85% cacao solids". USDA National Nutrient Database for Standard Reference.

Extended European search report dated Sep. 24, 2019 for corresponding European Patent Application No. 17760023.6.

Extended European search report dated Oct. 10, 2019 for corresponding European Patent Application No. 17760024.4.

Humann et al."New Technology Selection in the Processing of Utility Foods" China Light Industries Press, pp. 242-245, 2001.

Office Action dated Feb. 18, 2022, for the U.S. Appl. No. 16/082,216.

Office Action dated Mar. 9, 2022, for the Chinese Patent Application No. 201780014630.6.

\* cited by examiner ions 2016-115392 and 2016-190075, filed on
CHOCOLATE-LIKE FOOD CONTAINING POLYUNSATURATED FATTY ACID

CROSS REFERENCE TO RELATED APPLICATIONS

This application is the National Stage of International Application No. PCT/JP2017/007908, filed on Feb. 28, 2017, which claims priority to International Application No. PCT/JP2016/056457, filed on Mar. 2, 2016, and Japanese Application Nos. 2016-115392 and 2016-190075, filed on Jun. 9, 2016 and Sep. 28, 2016, respectively. The contents of the four aforementioned applications are hereby incorporated herein by reference in their entirety.

TECHNICAL FIELD

The present invention relates to a chocolate-like food product containing polyunsaturated-fatty-acid-containing oil and fat.

BACKGROUND ART

Chocolate-like food products, typically chocolate, are also a favorite of children. Thus, incorporation of a specific nutrient component into a chocolate-like food product can allow children to effortlessly intake the nutrient component.

Materials whose physiological effects are gathering attention include polyunsaturated fatty acids, typified by DHA and EPA. However, it is often difficult to incorporate polyunsaturated fatty acids, which are susceptible to oxidative deterioration, into regular food products.

Patent Literature (PTL) 1 discloses a chocolate composition comprising non-hydrogenated oil-and-fat containing eicosapentaenoic acid and/or docosahexaenoic acid, and at least one type of catechin.

PTL 2 discloses a polyunsaturated-fatty-acid-containing food product comprising a film of oil and fat obtained by coating polyunsaturated-fatty-acid-containing oil and fat with an edible film-forming substance comprising a protein or a salt thereof, a lipid, or a combination thereof such that the oil and fat are substantially insulated from the outside air, the film of oil and fat being in the form of particles having a diameter of 2 mm or less.

PTL 3 discloses using proline as an anti-oxidant.

PTL 4 discloses using proline to adjust the flavor of chocolate.

CITATION LIST

Patent Literature

PTL 1: JPH05-292885A
PTL 2: JPS59-17949A
PTL 3: JP2004-331724A
PTL 4: JP2005-506847A

SUMMARY OF INVENTION

Technical Problem

The present invention relates to a chocolate-like food product containing polyunsaturated-fatty-acid-containing oil and fat, and an object of the present invention is to provide a chocolate-like food product with reduced flavor change that occurs with time.

Solution to Problem

The present inventors conducted extensive research to achieve the object.

The method disclosed in PTL 1 is considered to achieve, to some extent, an effect of reducing changes that occur with time; however, chocolate-like food products having a relatively long best-before period require a stronger effect.

The method disclosed in PTL 2 involves the addition of a polyunsaturated fatty acid in a capsule form; thus, its application to chocolate-like food products, which are valued for melting texture in the mouth, was difficult.

PTL 3 discloses using proline as an anti-oxidant. PTL 3 also discloses use in chocolates. However, this is only disclosed in a list of various food products, and their specific effects are nowhere disclosed. PTL 3 also nowhere discloses an effect on polyunsaturated-fatty-acid-containing chocolate-like food products.

PTL 4 only discloses using proline as a flavor precursor for chocolate flavor, and PTL 4 nowhere discloses an effect on polyunsaturated-fatty-acid-containing chocolate-like food products.

The present inventors conducted further research and found that incorporation of amino acid into a chocolate-like food product containing polyunsaturated-fatty-acid-containing oil and fat significantly reduces the unpleasant odor that occurs with time. The present invention has thus been accomplished.

Specifically, the present invention relates to the following:

(1) A chocolate-like food product containing EPA and DHA in a total amount of 0.02 to 10 wt %, and further containing an amino acid in an amount of 0.002 to 0.5 wt %.

(2) The chocolate-like food product according to Item (1), wherein the amino acid is at least one amino acid selected from glycine, glutamic acid, alanine, proline, lysine, tryptophan, methionine, valine, serine, histidine, isoleucine, leucine, phenylalanine, arginine, threonine, cysteine, aspartic acid, glutamine, or asparagine.

(3) The chocolate-like food product according to Item (1), containing catechin in an amount of 0.005 to 0.4 wt %.

(4) The chocolate-like food product according to Item (2), containing catechin in an amount of 0.005 to 0.4 wt %.

(5) The chocolate-like food product according to Item (1), containing 0.02 to 2 wt % of an aqueous phase in a dispersed state, the aqueous phase containing the amino acid in an amount of 1 to 50 wt % and having a total water-soluble solids content of 30 to 70 wt %.

(6) The chocolate-like food product according to Item (2), containing 0.02 to 2 wt % of an aqueous phase in a dispersed state, the aqueous phase containing the amino acid in an amount of 1 to 50 wt % and having a total water-soluble solids content of 30 to 70 wt %.

(7) The chocolate-like food product according to Item (3), containing 0.02 to 2 wt % of an aqueous phase in a dispersed state, the aqueous phase containing the amino acid in an amount of 1 to 50 wt % and having a total water-soluble solids content of 30 to 70 wt %.

(8) The chocolate-like food product according to Item (4), containing 0.02 to 2 wt % of an aqueous phase in a dispersed state, the aqueous phase containing the amino acid in an amount of 1 to 50 wt % and having a total water-soluble solids content of 30 to 70 wt %.

(9) The chocolate-like food product according to Item (5), wherein the aqueous phase contains catechin in an amount of 2 to 50 wt %.

(10) The chocolate-like food product according to Item (6), wherein the aqueous phase contains catechin in an amount of 2 to 50 wt %.

(11) The chocolate-like food product according to Item (7), wherein the aqueous phase contains the catechin in an amount of 2 to 50 wt %.

(12) The chocolate-like food product according to Item (8), wherein the aqueous phase contains the catechin in an amount of 2 to 50 wt %.

(13) The chocolate-like food product according to any one of Items (5) to (12), wherein the aqueous phase contains, as the water-soluble solids content, at least one member selected from sugar alcohols, glucose, sucrose, dextrins, or oligosaccharides.

(14) A method for producing a chocolate-like food product, the method comprising the steps of:

dispersing an aqueous phase containing an amino acid in an amount of 1 to 50 wt % and having a total water-soluble solids content of 30 to 70 wt % in polyunsaturated-fatty-acid-containing oil and fat; and blending the polyunsaturated-fatty-acid-containing oil and fat to obtain a chocolate-like food product containing EPA and DHA in a total amount of 0.02 to 10 wt %, and further containing the amino acid in an amount of 0.002 to 0.5 wt %.

(15) The method for producing a chocolate-like food product according to Item (14), the method comprising the step of adding 2 to 50 wt % of catechin to the aqueous phase.

(16) The method for producing a chocolate-like food product according to Item (14) or (15), the method comprising the step of adding, as the water-soluble solids content, at least one member selected from sugar alcohols, glucose, sucrose, dextrins, or oligosaccharides to the aqueous phase.

In other words, the invention includes the following.

(21) A chocolate-like food product containing EPA and DHA in a total amount of 0.02 to 10 wt %, and further containing an amino acid in an amount of 0.002 to 0.5 wt %.

(22) The chocolate-like food product according to Item (21), wherein the amino acid is at least one amino acid selected from glycine, alanine, threonine, phenylalanine, serine, valine, proline, glutamic acid, lysine, or aspartic acid.

(23) The chocolate-like food product according to Item (21) or (22), containing catechin in an amount of 0.005 to 0.4 wt %.

(24) The chocolate-like food product according to Item (21) or (22), containing 0.02 to 2 wt % of an aqueous phase in a dispersed state, the aqueous phase containing the amino acid in an amount of 1 to 50 wt % and having a total water-soluble solids content of 30 to 70 wt %.

(25) The chocolate-like food product according to Item (24), wherein the aqueous phase contains catechin in an amount of 2 to 50 wt %.

(26) A method for producing a chocolate-like food product, the method comprising the steps of:

dispersing an aqueous phase containing an amino acid in an amount of 1 to 50 wt % and having a total water-soluble solids content of 30 to 70 wt % in polyunsaturated-fatty-acid-containing oil and fat; and blending the polyunsaturated-fatty-acid-containing oil and fat to obtain a chocolate-like food product containing EPA and DHA in a total amount of 0.02 to 10 wt %, and further containing the amino acid in an amount of 0.002 to 0.5 wt %.

Advantageous Effects of Invention

The present invention can reduce the flavor change that occurs with time of a chocolate-like food product containing polyunsaturated-fatty-acid-containing oil and fat.

DESCRIPTION OF EMBODIMENTS

An example of a "chocolate-like food product" as used in the present invention is chocolates. "Chocolates" as used herein refers not only to chocolate, quasi-chocolate, and chocolate-using food products as defined by the Japan Fair Trade Council of Chocolate Industry or the Fair Trade Council of Chocolate-Using Products, but also to those containing oil and fat as essential components, optionally with adjuncts, such as sugar, milk powder, cacao starting materials (e.g., cacao mass, cocoa, and cocoa butter), fruit-juice powder, fruit powder, taste improvers, emulsifiers, flavoring, and color additives in any amounts.

Typical examples of chocolates include sweet chocolates, milk chocolates, and white chocolates. Examples also include strawberry chocolates and the like that contain a fruit component.

The polyunsaturated-fatty-acid-containing oil and fat as used in the present invention contain at least one polyunsaturated fatty acid as the constituent fatty acid. The polyunsaturated fatty acids as used herein refer to fatty acids with many double bonds and may also be called "PUFAs." Specific examples include DHA (docosahexaenoic acid) and EPA (eicosapentaenoic acid). The polyunsaturated-fatty-acid-containing oil and fat may be also referred to as "PUFA oil."

It is essential for the chocolate-like food product according to the present invention to contain polyunsaturated-fatty-acid-containing oil and fat such that the total amount of DHA and EPA is 0.02 to 10 wt %, preferably 0.2 to 8 wt %, and more preferably 1 to 6 wt %. Incorporation of an appropriate amount of polyunsaturated-fatty-acid-containing oil and fat is expected to achieve its effect.

It is essential for the chocolate-like food product according to the present invention to contain an amino acid in an amount of 0.002 to 0.5 wt %, preferably 0.006 to 0.2 wt %, and more preferably 0.01 to 0.15 wt %. Incorporating an appropriate amount of amino acid makes it possible to reduce the unpleasant odor that occurs with time in the chocolate-like food product that contains DHA and EPA in a total amount of 0.02 to 10 wt %.

The amino acid can also be added as a salt. For example, sodium glutamate may be added instead of glutamic acid, and sodium aspartate may be added instead of aspartic acid. In the present invention, even when the term "amino acid" is simply used, the scope of this term also encompasses salts thereof.

Various amino acids may be used as the amino acid. It is preferable to use at least one amino acid selected from glycine, glutamic acid, alanine, proline, lysine, tryptophan, methionine, valine, serine, histidine, isoleucine, leucine, phenylalanine, arginine, threonine, cysteine, aspartic acid, glutamine, or asparagine; it is more preferable to use at least one amino acid selected from glycine, glutamic acid, alanine, proline, lysine, tryptophan, methionine, valine, serine, histidine, isoleucine, leucine, or phenylalanine; it is still more preferable to use at least one amino acid selected from glycine, glutamic acid, alanine, proline, lysine, tryptophan, or methionine.

Some amino acids are less soluble, and such amino acids may be used in combination with other amino acids.

The use of an appropriate amino acid makes it possible to reduce the unpleasant odor that occurs with time in the chocolate-like food product that contains DHA and EPA in a total amount of 0.02 to 10 wt %.

The present invention is characterized in that the amino acid is present in a dissolved state in water in the chocolate-like food product. In the present invention, an aqueous solution in which the amino acid is dissolved is referred to as an "aqueous phase." The concentration of the amino acid in the aqueous phase is preferably 1 to 50 wt %, more preferably 1.5 to 40 wt %, and still more preferably 2 to 26 wt %.

If the amino acid concentration in the aqueous phase is appropriate, it is possible to reduce the unpleasant odor that occurs with time in the chocolate-like food product that contains DHA and EPA in a total amount of 0.02 to 10 wt %.

In the present invention, a carbohydrate is preferably dissolved in the aqueous phase. The carbohydrate is preferably at least one member selected from sugar alcohols, oligosaccharides, various monosaccharides, such as glucose, various disaccharides, such as sucrose, or dextrins, more preferably a sugar alcohol, sucrose, or a dextrin, and even more preferably sucrose or a sugar alcohol.

Of sugar alcohols, preferred are glycerol, maltitol, sorbitol, and erythritol; more preferred is erythritol.

The carbohydrate is used in the aqueous phase in a total amount with other water-soluble solids including the amino acid, of preferably 30 to 70 wt %, more preferably 32 to 65 wt %, and still more preferably 34 to 61 wt %.

If an appropriate amount of an appropriate carbohydrate is used to adjust the solids content to an appropriate value, it is possible to reduce the unpleasant odor that occurs with time in the chocolate-like food product that contains DHA and EPA in a total amount of 0.02 to 10 wt %.

In the present invention, the aqueous phase in an amount of preferably 0.02 to 2 wt %, more preferably 0.04 to 1.8 wt %, and still more preferably 0.06 to 1.6 wt %, is present in a dispersed state in the chocolate-like food product that contains DHA and EPA in a total amount of 0.02 to 10 wt %.

If an appropriate amount of the aqueous phase is dispersed, it is possible to reduce the unpleasant odor that occurs with time in the chocolate-like food product that contains DHA and EPA in a total amount of 0.02 to 10 wt %.

It is also possible to use vitamin C or catechin as an anti-oxidant. If contained, the amount of catechin in the aqueous phase is preferably 2 to 50 wt %, more preferably 10 to 45 wt %, and still more preferably 12 to 43 wt %.

In the chocolate-like food product that contains DHA and EPA in a total amount of 0.02 to 10 wt %, catechin is preferably contained in an amount of 0.005 to 0.4 wt %, and more preferably 0.04 to 0.3 wt %.

The use of catechin in an appropriate amount makes it possible to reduce the unpleasant odor that occurs with time in the chocolate-like food product that contains DHA and EPA in a total amount of 0.02 to 10 wt %.

The use of vitamin C, however, in the chocolate-like food product that contains DHA and EPA in a total amount of 0.02 to 10 wt % may cause a specific unpleasant taste.

The present invention is characterized in that an amino acid is used as an anti-oxidant, and this makes it possible to obtain a chocolate-like food product that contains PUFA oil such that DHA and EPA are present in a total amount of 0.02 to 10 wt %, without impairing the fundamental flavor of chocolate.

The following describes the method for preparing a chocolate-like food product according to the present invention.

First, an aqueous phase is prepared. The aqueous phase as used herein is prepared for the purpose of imparting anti-oxidative activity to a chocolate-like food product that contains DHA and EPA in a total amount of 0.02 to 10 wt % and essentially consists of water, an amino acid, and a carbohydrate.

Although the chocolate-like food product contains in itself a carbohydrate to achieve sweetness, this carbohydrate is distinguished from the carbohydrate in the aqueous phase since the carbohydrate in the aqueous phase is present in a dissolved state in the aqueous phase.

The amounts of the amino acid and carbohydrate in the aqueous phase are as stated above.

In the present invention, the water-soluble solids content in the aqueous phase must be present in a substantially dissolved state. The determination of whether the water-soluble solids are substantially dissolved is made by introducing 5 ml of the aqueous phase into a 20-ml centrifugal tube, followed by centrifugal separation (3000×g, 1 minute) at 20° C. If no precipitate is visually observed even after this process, a substantially dissolved state is considered to be achieved.

In the present invention, expressions such as "contained in the aqueous phase" mean being present in the dissolved state in the aqueous phase, as described above.

When the water-soluble solids content is dissolved in the aqueous phase, it is possible to reduce the unpleasant odor that occurs with time in the chocolate-like food product that contains DHA and EPA in a total amount of 0.02 to 10 wt %.

The prepared aqueous phase is dispersed in oil and fat. There is no limitation on the oil and fat used here. It is possible to use oils and fats such as soybean oil and rapeseed oil, which are commonly used as edible fats and oils. It is also possible to use polyunsaturated-fatty-acid-containing oil and fat from this stage.

An oil-soluble emulsifier is preferably dissolved in advance in the oil and fat to be used. Examples of the oil-soluble emulsifier used include a polyglycerol condensed ricinoleates, sugar esters, glycerol fatty acid esters, and lecithins, with a polyglycerol condensed ricinoleate being preferable. The polyglycerol condensed ricinoleate (polyglycerol polyricinoleate) may be abbreviated as "PGPR."

The use of an appropriate oil-soluble emulsifier makes it possible to reduce the unpleasant odor that occurs with time in the chocolate-like food product that contains DHA and EPA in a total amount of 0.02 to 10 wt %. The phase obtained by dissolving the oil-soluble emulsifier in oil and fat is called an "oil phase."

Next, the aqueous phase is mixed with the oil phase to obtain an oil-and-fat composition in the form of a water-in-oil emulsion. Here, various devices can be used as an emulsifying device, as typified by a high-pressure homogenizer. The obtained oil-and-fat composition in the form of a water-in-oil emulsion is used as one of the starting materials of the chocolate-like food product that contains DHA and EPA in a total amount of 0.02 to 10 wt %.

The chocolate base itself of the chocolate-like food product that contains DHA and EPA in a total amount of 0.02 to 10 wt % according to the present invention can be prepared by commonly used methods. Existing chocolates may be used by melting.

The following describes the simplest preparation method that involves melting of existing chocolate.

As the chocolate, a commercially available chocolate product can be used. For example, "Couverture Sweet" produced by Fuji Oil Co., Ltd., may be used.

The chocolate is melted in hot water at 50 to 60° C. Then, the oil-and-fat composition in the form of a water-in-oil emulsion and polyunsaturated-fatty-acid-containing oil-and-fat are added thereto. If the oil-and-fat composition in the form of water-in-oil emulsion is prepared using polyunsaturated-fatty-acid-containing oil and fat, then a further addition of a polyunsaturated fatty acid is not essential here.

Additionally, to adjust the hardness, hard butter that is melted in advance is suitably added. After homogenization, tempering is suitably performed, and then, the resulting product is put into a mold.

Subsequently, cooling is performed at 3 to 10° C. to obtain a final product.

The Examples are described below.

EXAMPLES

Study 1

Samples of formulations shown in Table 1 were prepared in accordance with the "Method for preparing a polyunsaturated-fatty-acid-containing chocolate-like food product" section.

The obtained samples were evaluated by the "Method of evaluation of polyunsaturated-fatty-acid-containing chocolate-like food product" section. Table 2 shows the results.

TABLE 1

| | | Formulations | | | | | | | | | | |
|---|---|---|---|---|---|---|---|---|---|---|---|---|
| | | Ex. 1 | Ex. 2 | Ex. 3 | Ex. 4 | Ex. 5 | Ex. 6 | Ex. 7 | Ex. 8 | Ex. 9 | Ex. 10 | Ex. 11 |
| Aqueous phase | Maltitol | 0.04 | 0.07 | 0.23 | 0.14 | 0.02 | 0.14 | — | — | — | — | — |
| | Erythritol | — | — | — | — | — | — | — | — | — | 0.06 | 0.02 |
| | Sugar | — | — | — | — | — | — | 0.04 | 0.16 | 0.09 | — | 0.03 |
| | Catechin | — | — | — | — | — | — | — | 0.075 | 0.150 | 0.200 | — |
| | Gly | 0.020 | — | — | — | — | — | — | — | — | 0.010 | — |
| | Ala | — | 0.020 | — | — | — | — | — | — | — | — | — |
| | Phe | — | — | 0.020 | — | — | — | — | — | — | — | — |
| | Thr | — | — | — | 0.020 | — | — | — | — | — | — | — |
| | Ser | — | — | — | — | 0.020 | — | — | — | — | — | — |
| | Val | — | — | — | — | — | 0.020 | — | — | — | — | — |
| | Pro | — | — | — | — | — | — | 0.019 | 0.020 | 0.020 | — | — |
| | Glutamic acid | — | — | — | — | — | — | — | — | — | — | 0.020 |
| | Water | 0.08 | 0.14 | 0.47 | 0.28 | 0.05 | 0.28 | 0.04 | 0.26 | 0.26 | 0.20 | 0.06 |
| Oil phase | Emulsifier | 0.12 | 0.21 | 0.70 | 0.42 | 0.07 | 0.42 | 0.06 | 0.28 | 0.28 | 0.20 | 0.06 |
| | Soybean oil | 5.57 | 5.39 | 4.41 | 4.97 | 5.67 | 4.97 | 2.21 | 1.56 | 1.56 | 2.80 | 3.29 |
| | PUFA oil 1 | 5.69 | 5.69 | 5.69 | 5.69 | 5.69 | 5.69 | 6.35 | 6.35 | 6.35 | — | — |
| | PUFA oil 2 | — | — | — | — | — | — | — | — | — | 8.48 | 8.48 |
| Hard butter | | 11.52 | 11.52 | 11.52 | 11.52 | 11.52 | 11.52 | 8.7 | 8.71 | 8.71 | 11.96 | 11.96 |
| Chocolate 1 | | 76.960 | 76.960 | 76.960 | 76.960 | 76.960 | 76.960 | — | — | — | 76.090 | 76.081 |
| Chocolate 2 | | — | — | — | — | — | — | 82.581 | 82.585 | 82.580 | — | — |
| Total | | 100.00 | 100.00 | 100.00 | 100.00 | 100.00 | 100.00 | 100.00 | 100.00 | 100.00 | 100.00 | 100.00 |
| Water-soluble solids content in aqueous phase (wt %) | | 42.86 | 39.13 | 35.19 | 36.37 | 48.15 | 36.37 | 59.60 | 49.51 | 50.00 | 57.45 | 53.85 |
| Amount of amino acid in aqueous phase (wt %) | | 14.29 | 8.70 | 2.78 | 4.55 | 22.22 | 4.55 | 19.19 | 3.88 | 3.85 | 2.13 | 15.38 |
| Amount of catechin in aqueous phase (wt %) | | — | — | — | — | — | — | — | 14.56 | 28.89 | 42.55 | — |
| Amount of aqueous phase in chocolate-like food product (wt %) | | 0.14 | 0.23 | 0.72 | 0.44 | 0.09 | 0.44 | 0.10 | 0.52 | 0.52 | 0.47 | 0.13 |
| Total amount of DHA and EPA in chocolate-like food product (wt %) | | 3.21 | 3.21 | 3.21 | 3.21 | 3.21 | 3.21 | 3.58 | 3.58 | 3.58 | 3.97 | 3.97 |

| | | Ex. 12 | Ex. 13 | Ex. 14 | Ex. 15 | Ex. 16 | Ex. 17 | Comp. Ex. 1 | Comp. Ex. 2 | Comp. Ex. 3 | Comp. Ex. 4 | Comp. Ex. 5 |
|---|---|---|---|---|---|---|---|---|---|---|---|---|
| Aqueous phase | Erythritol | 0.02 | 0.02 | 0.08 | — | — | — | — | — | — | — | — |
| | Sorbitol | — | — | — | 0.23 | 0.21 | 0.03 | — | — | — | — | — |
| | Sugar | 0.03 | 0.03 | — | — | — | — | — | 0.07 | — | 0.06 | — |
| | Vitamin C | — | — | — | — | — | — | — | 0.005 | — | — | — |
| | Catechin | — | — | 0.200 | — | 0.020 | 0.200 | — | 0.130 | — | 0.150 | — |
| | Gly | — | — | 0.050 | 0.050 | 0.050 | 0.050 | — | — | — | — | — |
| | Ser | — | — | 0.102 | — | — | — | — | — | — | — | — |
| | Glutamic acid | — | — | 0.102 | — | — | — | — | — | — | — | — |
| | Lysine hydrochloride | 0.020 | — | — | — | — | — | — | — | — | — | — |
| | Sodium aspartate | — | 0.030 | — | — | — | — | — | — | — | — | — |
| | Water | 0.06 | 0.06 | 0.38 | 0.20 | 0.20 | 0.20 | — | 0.14 | — | 0.15 | — |
| Oil phase | Emulsifier | 0.06 | 0.06 | 0.38 | 0.20 | 0.20 | 0.20 | — | 0.23 | — | 0.23 | — |
| | Soybean oil | 3.29 | 3.29 | 2.19 | 1.14 | 1.14 | 1.14 | 5.83 | 5.25 | 2.36 | 1.78 | 3.48 |
| | PUFA oil 1 | — | — | — | 6.71 | 6.71 | 6.71 | 5.69 | 5.69 | 6.35 | 6.35 | — |
| | PUFA oil 2 | 8.48 | 8.48 | 8.48 | — | — | — | — | — | — | — | 8.48 |
| Hard butter | | 11.96 | 11.96 | 11.96 | 8.52 | 8.52 | 8.52 | 11.52 | 11.52 | 8.71 | 8.71 | 11.96 |
| Chocolate 1 | | 76.08 | 76.07 | 76.08 | 82.950 | 82.950 | 82.950 | 76.960 | 76.965 | — | — | 76.080 |
| Chocolate 2 | | — | — | — | — | — | — | — | — | 82.580 | 82.570 | — |
| Total | | 100.00 | 100.00 | 100.00 | 100.00 | 100.00 | 100.00 | 100.00 | 100.00 | 100.00 | 100.00 | 100.00 |

TABLE 1-continued

| | Formulations | | | | | | | | | |
|---|---|---|---|---|---|---|---|---|---|---|
| Water-soluble solids content in aqueous phase (wt %) | 53.85 | 57.14 | 58.42 | 58.33 | 58.33 | 58.33 | — | 59.42 | — | 58.33 | — |
| Amount of amino acid in aqueous phase (wt %) | 15.38 | 21.43 | 27.79 | 10.42 | 10.42 | 10.42 | — | — | — | — | — |
| Amount of catechin in aqueous phase (wt %) | — | — | 21.88 | — | 4.17 | 41.67 | — | 37.68 | — | 41.67 | — |
| Amount of aqueous phase in chocolate-like food product (wt %) | 0.13 | 0.14 | 0.91 | 0.48 | 0.48 | 0.48 | — | 0.35 | — | 0.36 | — |
| Total amount of DHA and EPA in chocolate-like food product (wt %) | 3.97 | 3.97 | 3.97 | 3.78 | 3.78 | 3.78 | 3.21 | 3.21 | 3.58 | 3.58 | 3.97 |

(The formulations are in percent by weight.)

For the emulsifier, a polyglycerol condensed ricinoleic acid ester "CRS-75" produced by Sakamoto Yakuhin Kogyo Co., Ltd., was used.

For the soybean oil, soybean sirasimeyu (refined soybean oil) produced by Fuji Oil Co., Ltd., was used.

For the glycine and serine, food additive grade glycine and serine produced by Kyowa Hakko Kogyo Co., Ltd., were used. For the other amino acids, those of food additive grade produced by Nippon Rika Co., Ltd., were used.

For PUFA oil 1, oil-and-fat containing EPA (19.09%) and DHA (37.31%) were used.

For PUFA oil 2, oil-and-fat containing EPA (1%) and DHA (45.8%) were used.

For the hard butter, "Melano SS600" as a tempering type hard butter produced by Fuji Oil Co., Ltd., was used.

For chocolate 1, "Milk Chocolate E" produced by Fuji Oil Co., Ltd., was used.

For chocolate 2, "Sweet Chocolate E" produced by Fuji Oil Co., Ltd., was used.

The water-soluble solids content was in the dissolved state in all of the Examples and Comparative Examples in which the aqueous phase was prepared.

Method for Preparing a Polyunsaturated-Fatty-Acid-Containing Chocolate-Like Food Product 1. The aqueous phase components shown in the formulations were dissolved in water.
2. The oil phase components shown in the formulations were mixed.
3. The aqueous phase was added to the oil phase, and a high-pressure homogenizer was used to obtain an oil-and-fat composition in the form of a water-in-oil emulsion.
4. The chocolate and hard butter were melted in hot water at 50 to 60° C. and mixed.
5. The oil-and-fat composition in the form of water-in-oil emulsion obtained in 3 was mixed with the product obtained in 4.
6. The resulting product was poured into a plastic container and solidified at 3 to 6° C.

Method of Evaluation of Polyunsaturated-Fatty-Acid-Containing Chocolate-Like Food Product 1. The chocolate-like food product samples were each placed into an aluminum deposition bag and stored at 20° C. while shielded from light.
2. A group of 3 panelists appropriately performed sensory evaluation in accordance with the following criteria.
3. Samples that obtained two or more points on Day 15 or later were evaluated as pass.

Sensory Evaluation Criteria

Three points: No unpleasant flavor as chocolate.
Two points: Some unpleasant flavor but acceptable.
One point: Strong unpleasant flavor and unacceptable.

TABLE 2

| | Results | | | | | | | | |
|---|---|---|---|---|---|---|---|---|---|
| | Immediately after preparation | Day 6 | Day 7 | Day 8 | Day 15 | Day 17 | Day 30 | Day 38 | Day 45 |
| Comp. Ex. 1 | 3 | 1 | — | — | 1 | — | 1 | 1 | 1 |
| Comp. Ex. 2 | 3 | 3 | — | — | 1 | — | 1 | 1 | 1 |
| Comp. Ex. 3 | 3 | — | — | — | 1 | — | — | — | — |
| Comp. Ex. 4 | 3 | — | — | — | 1 | — | — | — | — |
| Comp. Ex. 5 | 3 | — | 1 | — | — | — | — | — | — |
| Ex. 1 | 3 | 3 | — | — | 3 | — | 3 | 3 | 1 |
| Ex. 2 | 3 | 3 | — | — | 3 | — | 3 | 3 | 1 |
| Ex. 3 | 3 | 3 | — | — | 3 | — | 3 | 3 | 1 |
| Ex. 4 | 3 | 3 | — | — | 3 | — | 3 | 2 | 1 |
| Ex. 5 | 3 | 3 | — | — | 3 | — | 3 | 3 | 1 |
| Ex. 6 | 3 | 3 | — | — | 3 | — | 3 | 2 | 1 |
| Ex. 7 | 3 | — | — | — | 3 | — | — | — | — |
| Ex. 8 | 3 | — | — | — | 3 | — | — | — | — |
| Ex. 9 | 3 | — | — | — | 3 | — | — | — | — |
| Ex. 10 | 3 | — | 3 | — | — | 3 | — | — | — |
| Ex. 11 | 3 | — | 3 | — | — | 3 | — | — | — |
| Ex. 12 | 3 | — | 3 | — | — | 3 | — | — | — |

TABLE 2-continued

| | Results | | | | | | | |
|---|---|---|---|---|---|---|---|---|
| | Immediately after preparation | Day 6 | Day 7 | Day 8 | Day 15 | Day 17 | Day 30 | Day 38 | Day 45 |
| Ex. 13 | 3 | — | 3 | — | — | 3 | — | — | — |
| Ex. 14 | 3 | — | 3 | — | — | 3 | — | — | — |
| Ex. 15 | 3 | — | — | 3 | 2 | — | — | — | — |
| Ex. 16 | 3 | — | — | 3 | 3 | — | — | — | — |
| Ex. 17 | 3 | — | — | 3 | 3 | — | — | — | — |

Discussion

The use of vitamin C, which is a common anti-oxidant, gave flavor characteristic to vitamin C, which was incompatible with the flavor of chocolate, resulting in a low evaluation score.

The use of amino acid as an anti-oxidant achieved sufficiently strong antioxidative activity, and also did not interfere with the flavor of chocolate, making it possible to obtain excellent products.

Study 2

To evaluate the antioxidative activity with the use of various amino acids under uniform conditions, tests were performed by adjusting the molar concentrations to be equal to each other.

Table 3 shows the formulations. Samples for evaluation of antioxidative activity were prepared in accordance with the "Method for preparing samples for evaluation of antioxidative activity" section.

The obtained samples were evaluated by the "Method of evaluation of antioxidative activity" section. Table 4 shows the results.

TABLE 3

| | | Formulations | | | | | | | | | |
|---|---|---|---|---|---|---|---|---|---|---|---|
| | | Study 2-1 | Study 2-2 | Study 2-3 | Study 2-4 | Study 2-5 | Study 2-6 | Study 2-7 | Study 2-8 | Study 2-9 | Study 2-10 |
| Aqueous phase | Glycine | | 0.086 | | | | | | | | |
| | Leucine | | | 0.151 | | | | | | | |
| | Isoleucine | | | | 0.151 | | | | | | |
| | Arginine | | | | | 0.200 | | | | | |
| | Asparagine monohydrate | | | | | | 0.173 | | | | |
| | Glutamine | | | | | | | 0.168 | | | |
| | Methionine | | | | | | | | 0.172 | | |
| | Threonine | | | | | | | | | 0.137 | |
| | Histidine | | | | | | | | | | 0.178 |
| | Sugar powder | 8.00 | 7.91 | 7.85 | 7.85 | 7.80 | 7.85 | 7.83 | 7.83 | 7.86 | 7.82 |
| | Water | 8 | 8 | 8 | 8 | 8 | 8 | 8 | 8 | 8 | 8 |
| Oil phase | Emulsifier | 12 | 12 | 12 | 12 | 12 | 12 | 12 | 12 | 12 | 12 |
| | Soybean oil | 72.0 | 72.004 | 71.999 | 71.999 | 72.000 | 71.998 | 72.002 | 71.998 | 72.003 | 72.002 |
| Total | | 100.0 | 100.0 | 100.0 | 100.0 | 100.0 | 100.0 | 100.0 | 100.0 | 100.0 | 100.0 |
| Solids content in aqueous phase (%) | | 50 | 50 | 50 | 50 | 50 | 50 | 50 | 50 | 50 | 50 |
| Amino acid concentration (mM) in aqueous phase | | — | 144 | 144 | 144 | 144 | 144 | 144 | 144 | 144 | 144 |
| Particle size (μm) 5° C. after 1 day | | 48.94 | 46.85 | 45.91 | 45.92 | 46.41 | 46.34 | 52.15 | 53.2 | 52.55 | 51.9 |
| | | Study 2-11 | Study 2-12 | Study 2-13 | Study 2-14 | Study 2-15 | Study 2-16 | Study 2-17 | Study 2-18 | Study 2-19 | Study 2-20 |
| Aqueous phase | Alanine | 0.102 | | | | | | | | | |
| | Lysine hydrochloride | | 0.21 | | | | | | | | |
| | Proline | | | 0.132 | | | | | | | |
| | Serine | | | | 0.121 | | | | | | |
| | Valine | | | | | 0.135 | | | | | |
| | Sodium glutamate | | | | | | 0.194 | | | | |
| | Sodium aspartate | | | | | | | 0.204 | | | |
| | Cysteine | | | | | | | | 0.024 | | |
| | Phenylalanine | | | | | | | | | 0.033 | |
| | Tryptophan | | | | | | | | | | 0.041 |
| | Sugar powder | 7.9 | 7.79 | 7.87 | 7.88 | 7.87 | 7.81 | 7.98 | 7.8 | 7.97 | 7.96 |
| | Water | 8 | 8 | 8 | 8 | 8 | 8 | 8 | 8 | 8 | 8 |

TABLE 3-continued

| | | Formulations | | | | | | | | | |
|---|---|---|---|---|---|---|---|---|---|---|---|
| Oil phase | Emulsifier | 12 | 12 | 12 | 12 | 12 | 12 | 12 | 12 | 12 | 12 |
| | Soybean oil | 71.998 | 72 | 71.998 | 71.999 | 71.995 | 71.996 | 71.816 | 72.176 | 71.997 | 71.999 |
| Total | | 100.0 | 100.0 | 100.0 | 100.0 | 100.0 | 100.0 | 100.0 | 100.0 | 100.0 | 100.0 |
| Solids content in aqueous phase (%) | | 50 | 50 | 50 | 50 | 50 | 50 | 50 | 50 | 50 | 50 |
| Amino acid concentration (mM) in aqueous phase | | 144 | 144 | 144 | 144 | 144 | 144 | 144 | 25 | 25 | 25 |
| Particle size (μm) | | 52.04 | 53.20 | 52.50 | 50.08 | 49.72 | 50.64 | 54.13 | 52.07 | 48.00 | 49.82 |

(The formulations are in percent by weight.)

For the emulsifier, polyglycerol condensed ricinoleic acid ester "CRS-75" produced by Sakamoto Yakuhin Kogyo Co., Ltd., was used.

Method for Preparing Samples for Evaluation of Antioxidative Activity

1. The aqueous phase components shown in the formulations were dissolved in water.
2. The oil phase components shown in the formulations were mixed.
3. The aqueous phase was added to the oil phase, and a high-pressure homogenizer was used to obtain an oil-and-fat composition in the form of water-in-oil emulsion.

Method of Evaluation of Antioxidative Activity

1. Each sample was added to fish oil containing DHA (20.0%) and EPA (5.7%) such that the ratio of sample:fish oil=1:9, followed by stirring.
2. The oxidation stability of the liquid mixture obtained in 1 above was evaluated using a CDM measurement device (Rancimat produced by Metrohm) at 96° C. at an air blowing rate of 20.0 L/h with a sample introducing amount of 3.0 g.
3. The samples that had a CDM value equal to or greater than that of Study 2-1 were evaluated as pass.

TABLE 4

| | | | | | Results | | | | | |
|---|---|---|---|---|---|---|---|---|---|---|
| | Study 2-1 | Study 2-2 | Study 2-3 | Study 2-4 | Study 2-5 | Study 2-6 | Study 2-7 | Study 2-8 | Study 2-9 | Study 2-10 |
| CDM value (hrs) | 6.15 | 8.45 | 8.97 | 8.9 | 8.21 | 8.04 | 7.62 | 10.08 | 8.61 | 8.21 |
| | Study 2-11 | Study 2-12 | Study 2-13 | Study 2-14 | Study 2-15 | Study 2-16 | Study 2-17 | Study 2-18 | Study 2-19 | Study 2-20 |
| CDM value (hrs) | 8.72 | 8.87 | 10.09 | 8.27 | 8.91 | 8.02 | 8.28 | 7.32 | 7.28 | 8.13 |

Discussion

For amino acids of high solubility, the amino acid concentrations in the aqueous phase were adjusted to 144 mM for evaluation. For amino acids of low solubility, the amino acid concentrations in the aqueous phase were adjusted to 25 mM for evaluation.

The results showed a tendency of improvement in antioxidative activity with the use of any of these amino acids, compared to samples to which amino acids were not added.

Although chocolate-like food products were not prepared in Study 2, it is presumed that the effects would be achieved if a chocolate-like food product that contained DHA and EPA in a total amount of 0.02 to 10 wt % were prepared with the use of each of the tested amino acids in this study.

The invention claimed is:

1. A chocolate-like food product containing EPA and DHA included in polyunsaturated fatty acid-containing oil and fat in a total amount of 3.21 to 6 wt %, 0.02 to 2 wt % of an aqueous phase in a dispersed state, and hard butter, the aqueous phase having a total water-soluble solids content of 30 to 70 wt %, wherein the water-soluble solids include an amino acid and a carbohydrate, the amino acid is at least one member selected from glycine, glutamic acid, alanine, proline, lysine, tryptophan, methionine, valine, serine, histidine, isoleucine, leucine, phenylalanine, arginine, threonine, cysteine, aspartic acid, glutamine, and asparagine; the carbohydrate is at least one member selected from sugar alcohols, glucose, sucrose, dextrins, and oligosaccharides, the amino acid being in an amount of 2.13 to 50 wt % of the aqueous phase, the water-soluble solids are present in a dissolved state, the aqueous phase is dispersed in an oil phase containing an oil-soluble emulsifier and an edible oil and fat, and the amino acid is present in an amount of 0.01 to 0.15 wt % of the chocolate-like food product that is free of undesirable odors after storage for at least 15 days.

2. The chocolate-like food product according to claim 1, containing catechin in an amount of 0.005 to 0.4 wt %.

3. The chocolate-like food product according to claim 1, wherein the aqueous phase contains catechin in an amount of 2 to 50 wt %.

4. The chocolate-like food product according to claim 2, wherein the aqueous phase contains the catechin in an amount of 2 to 50 wt %.

5. A method for producing a chocolate-like food product, the method comprising the steps of:
  dispersing an aqueous phase containing an amino acid in an amount of 2.13 to 50 wt % and having a total water-soluble solids content of 30 to 70 wt % in polyunsaturated-fatty-acid-containing oil and fat, wherein the amino acid is at least one member selected from glycine, glutamic acid, alanine, proline, lysine, tryptophan, methionine, valine, serine, histidine, isoleucine, leucine, phenylalanine, arginine, threonine, cysteine, aspartic acid, glutamine, and asparagine; and blending the polyunsaturated-fatty-acid-containing oil and fat with hard butter to obtain a chocolate-like food product containing EPA and DHA contained in polyunsaturated-fatty-acid-containing oil and fat in a total amount of 3.21 to 6 wt % and containing the amino acid in an amount of 0.01 to 0.15 wt %, wherein the aqueous phase is present in an amount of 0.02 to 2 wt % in a dispersed state in an oil phase containing an oil-soluble emulsifier and an edible oil and fat, in the chocolate-like food product, the water-soluble solids include a carbohydrate, and the water-soluble solids are present in a dissolved state in the aqueous phase, wherein the carbohydrate is at least one member selected from sugar alcohols, glucose, sucrose, dextrins, and oligosaccharides; and the chocolate-like food product is free of undesirable odors after storage for at least 15 days.

6. The method for producing a chocolate-like food product according to claim 5, further comprising the step of adding 2 to 50 wt % of catechin to the aqueous phase.

7. A method for reducing an unpleasant odor that occurs with time in a chocolate-like food product that contains DHA and EPA, the method comprising the steps of:

dispersing an aqueous phase containing an amino acid in an amount of 2.13 to 50 wt % and having a total water-soluble solids content of 30 to 70 wt % in polyunsaturated-fatty-acid-containing oil and fat (PUFA oil), wherein the amino acid is at least one member selected from glycine, glutamic acid, alanine, proline, lysine, tryptophan, methionine, valine, serine, histidine, isoleucine, leucine, phenylalanine, arginine, threonine, cysteine, aspartic acid, glutamine, and asparagine; and blending the PUFA oil with hard butter to obtain a chocolate-like food product containing EPA and DHA contained in PUFA oil in a total amount of 3.21 to 6 wt %, and containing the amino acid in an amount of 0.01 to 0.15 wt % in which the chocolate-like food product is free of undesirable odors after storage for at least 15 days, wherein the aqueous phase is present in an amount of 0.02 to 2 wt % in a dispersed state in an oil phase containing an oil-soluble emulsifier and an edible oil and fat, in the chocolate-like food product, the water-soluble solids include a carbohydrate, and the water-soluble solids are present in a dissolved state in the aqueous phase, wherein the carbohydrate is at least one member selected from sugar alcohols, glucose, sucrose, dextrins, and oligosaccharides.

* * * * *